Figure 1:
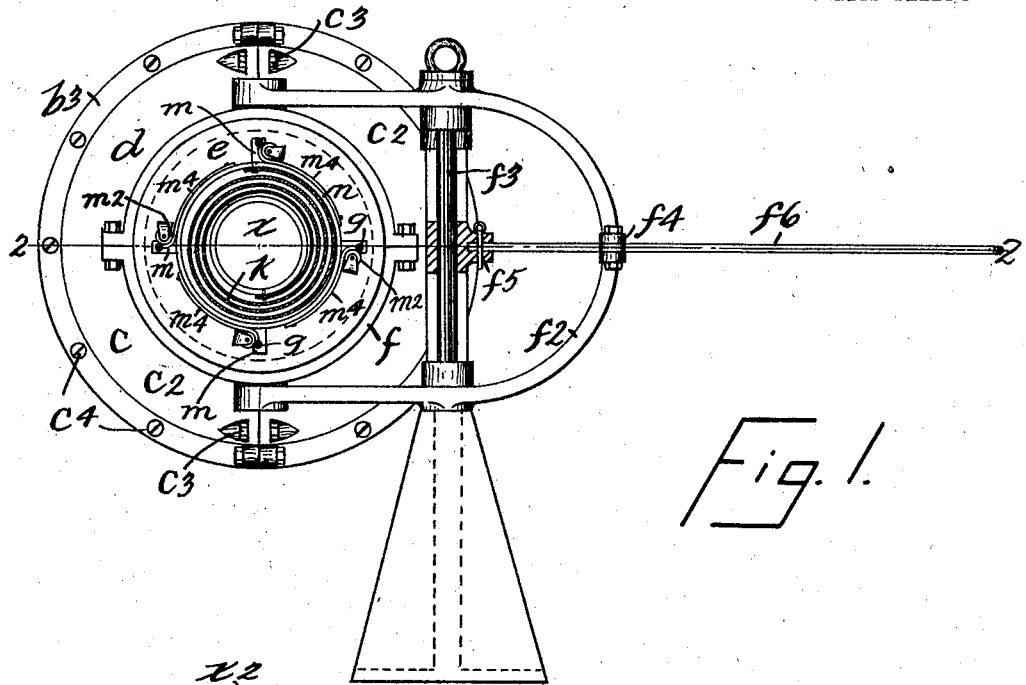

No. 823,753. PATENTED JUNE 19, 1906.
J. G. BABIO.
FRICTION CLUTCH.
APPLICATION FILED JAN. 10, 1906.

2 SHEETS—SHEET 1.

WITNESSES
J. E. Larsen
F. A. Stewart

INVENTOR
Jose Gonzalez Babio
BY
Edgar Tate
ATTORNEYS

No. 823,753. PATENTED JUNE 19, 1906.
J. G. BABIO.
FRICTION CLUTCH.
APPLICATION FILED JAN. 10, 1906.
2 SHEETS—SHEET 2.
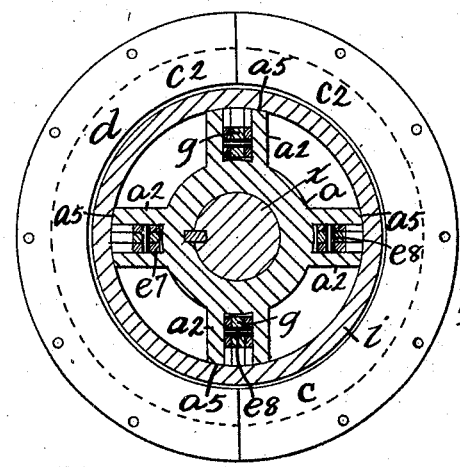
Fig. 3.
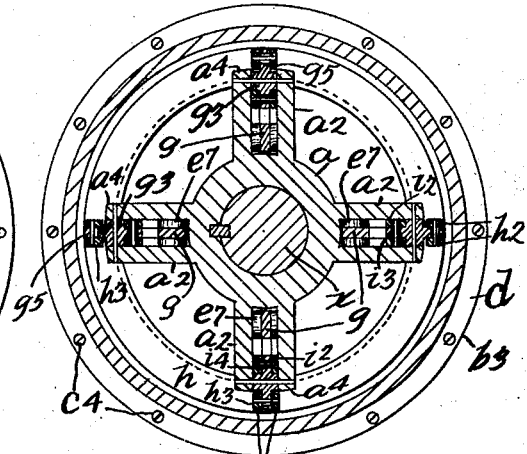
Fig. 4.
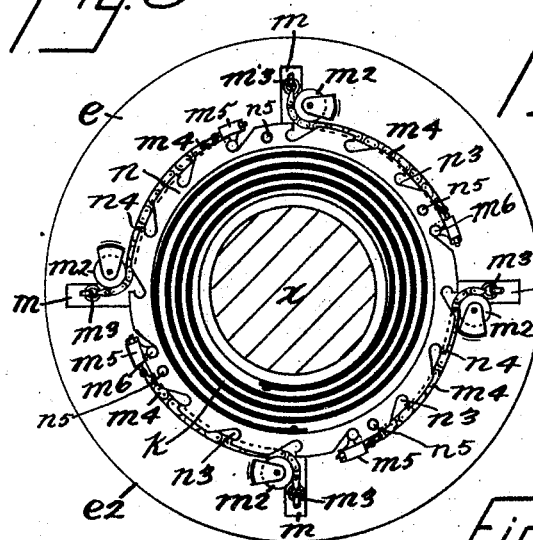
Fig. 5.
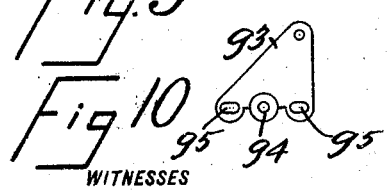
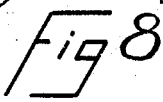
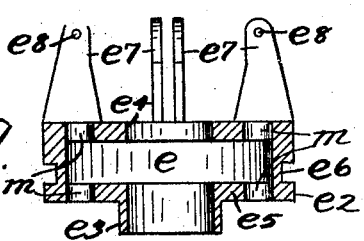
WITNESSES
J. C. Larsen
F. A. Stewart
INVENTOR
Jose Gonzalez Babio
BY Edgar Tate & Co
ATTORNEYS

UNITED STATES PATENT OFFICE.

JOSÉ GONZALEZ BABIO, OF NEW YORK, N. Y.

FRICTION-CLUTCH.

No. 823,753.   Specification of Letters Patent.   Patented June 19, 1906.

Application filed January 10, 1906. Serial No. 295,343.

*To all whom it may concern:*

Be it known that I, JOSÉ GONZALEZ BABIO, a subject of the King of Spain, residing at New York, in the county of New York and State of New York, have invented certain new and useful Improvements in Friction-Clutches, of which the following is a specification, such as will enable those skilled in the art to which it appertains to make and use the same.

This invention relates to friction-clutches for use in transmitting the motion of a driving or main power shaft to a driven or power-transmitting shaft; and the object thereof is to provide an improved device of this class, which I call a "double" friction-clutch and in which the friction-surface is comparatively large, my improved clutch being also more powerful than other devices of this class as usually constructed and being also lighter than ordinary friction-clutches and occupying less space on a shaft, a further advantage being in the fact that the friction parts can be readily removed in making repairs without removing the driving and driven pieces from the shaft or shafts.

Another object of the invention is to provide a friction-clutch of the class specified wherein the clutch devices are not affected by centrifugal motion or action and in which the said clutch devices are under automatic control; and with these and other objects in view the invention consists in a clutch device of the class specified constructed as hereinafter described and claimed.

The invention is fully disclosed in the following specification, of which the accompanying drawings form a part, in which the separate parts of my improvement are designated by suitable reference characters in each of the views, and in which—

Figure 2:
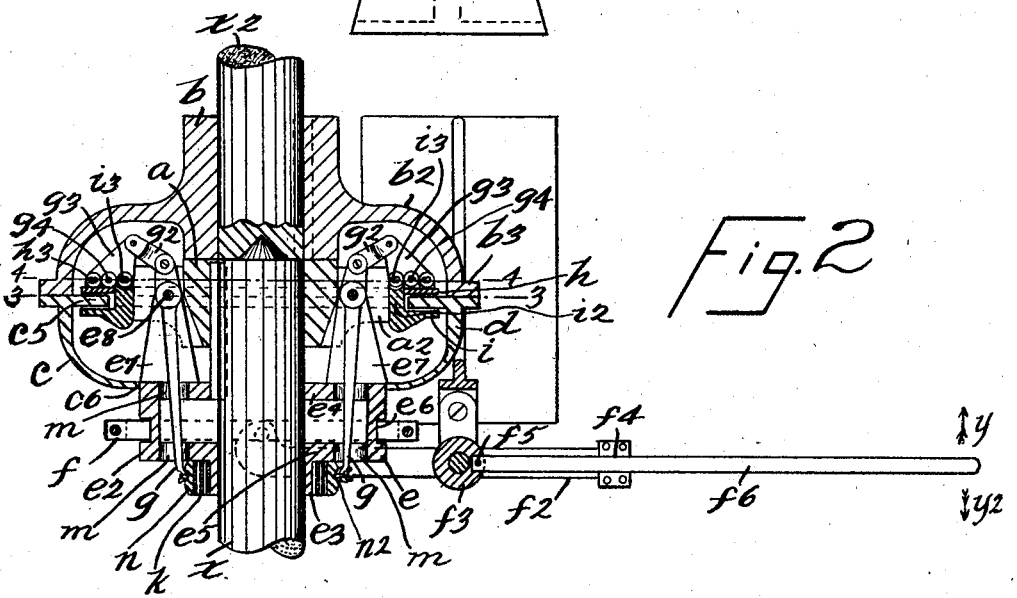

Figure 1 is a rear end view of that part of my improved clutch which in practice is mounted on the main power or driving shaft and showing the means for operating the cone member, part of the construction of the latter being in section; Fig. 2, a partial section on the line 2 2 of Fig. 1; Fig. 3, a section on the line 3 3 of Fig. 2; Fig. 4, a section on the line 4 4 of Fig. 2; Fig. 5, an enlarged back or outer view of the cone member and showing the main power or driving shaft in section; Fig. 6, a transverse section of a hub member which in practice is rigidly secured to the main power or driving shaft and which forms a part of the clutch mechanism connected with said shaft; Fig. 7, a transverse section of one of the movable friction members; Fig. 8, a similar view of the other movable friction member; Fig. 9, a transverse section of the cone member; and Fig. 10 a side view of a toggle-lever which forms a part of the clutch mechanism.

In the drawings forming part of this specification I have shown at $x$ a main power or driving shaft and at $x^2$ a driven or power-transmitting shaft, and in the practice of my invention I mount on and secure to the end of the shaft $x$ a driving-hub $a$, the rear end portion of which is preferably tapered, as shown in Figs. 2 and 6, and said hub is provided with radially-arranged pairs of arms $a^2$, provided at their outer ends with recesses $a^3$, forming projecting fingers $a^4$ and shoulders $a^5$, as clearly shown in Fig. 6, and said pairs of arms, as shown in Figs. 2 and 3, are four in number.

Mounted on and secured to the driven shaft $x^2$ is a sleeve-hub $b$, provided near its front end with a concavo-convex disk member $b^2$, the concave side of which is directed toward the shaft $x$, and the disk member $b^2$ is provided at its perimeter with a flange $b^3$, to which is bolted a supplemental concavo-convex disk member $c$, the concave side of which is directed toward the member $b^2$, and the parts $b^2$ and $c$ form a casing $d$, in which the operative parts of the clutch are mounted, and the part $c$ of the casing $d$ is divided diametrically to form two similar parts $c^2$, which are bolted together, as shown at $c^3$ in Fig. 1, and the part $c$ of the casing $d$ is secured to the part $b^2$ of said casing by screws or bolts, as shown at $c^4$, and the part $c$ of said casing is also provided at its perimeter or at its juncture with the part $b^2$ with an inwardly-directed annular clutch member $c^5$, which for the purpose of this description will be called a "main" clutch member or "casing" clutch member, and the clutch member $c^5$ forms, as will be understood, a part of the casing $d$ and is movable with said casing in the operation of the clutch, as hereinafter described.

The part $c$ of the casing $d$ is provided centrally with an opening $c^6$, and mounted on the shaft $x$ and movable longitudinally thereof is a collar $e$, comprising a main cylindrical part $e^2$, having a reduced portion $e^3$, and the main cylindrical part is provided with a front face member $e^4$ and a rear face member $e^5$, through which the shaft $x$ passes, and said main cylindrical part is also provided in its outer surface with an annular groove $e^6$, in which is mounted a ring or band $f$, with which is connected a yoke $f^2$, mounted on an upright support $f^3$, and pivotally connected with the yoke $f^2$ at $f^4$ and with the support $f^3$ at $f^5$ is an arm $f^6$, by which the yoke $f^2$ may be manipulated so as to move the cone member $e$ longitudinally of the shaft $x$.

The collar $e$, which is shown detached and in section in Fig. 9 and also in section in Fig. 2, is provided on the front or face thereof with a plurality of pairs of arms $e^7$, which extend in the direction of the hub $a$ and the ends of which project into the spaces between the pairs of arms $a^2$ on said hub, and pivoted between the ends of the pairs of the arms $e^7$, as shown at $e^8$, are levers $g$, the shorter arms of which project in the direction of the part $b^2$ of the casing $d$ and are provided with toggle-links $g^2$, which are pivoted thereto and also to toggle-levers $g^3$, which are triangular in form, and the toggle-levers $g^3$ are pivoted at $g^4$ to the fingers $a^4$ of the arms $a^2$ of the hub $a$.

Mounted in the recesses $a^3$ of the arms $a^2$ of the hub $a$ and on the side of the annular friction member $c^5$ of the casing $d$ adjacent to the driven shaft $x^2$ is an annular supplemental friction member $h$, movable toward and from the annular friction member $c^5$, and the annular friction member $h$ is provided on the side thereof adjacent to the hub $b$ with a plurality of pairs of ears $h^2$, as shown in Fig. 7, having pivot holes or openings $h^3$, in which are secured pivot-pins, and the toggle-levers $g^3$ are provided at their outer corners with oblong slots or openings $g^5$, through which said pivot-pins are passed, and this method of connecting the toggle-levers $g^3$ and the annular friction member $h$ permits of the operation of the said parts, as hereinafter described.

Mounted on the side of the annular friction member $c^5$ of the casing $d$ opposite the annular friction member $h$ and adjacent to the collar $e$ and resting in the recesses $a^3$ of the arms $a^2$ of the hub $a$ is another annular supplemental friction clutch member $i$, movable toward and from the friction member $c^5$ and provided with ears $i^2$, which range in the direction of the hub $b$ and shaft $x^2$ inwardly of the friction member $c^5$ and to which the inner corners of the toggle-levers $g^3$ are pivoted, as shown at $i^3$ in Fig. 2, and the ears $i^2$ are provided with pivot-pins at $i^4$, by means of which this connection is made and which permits of the operation of the toggle-levers $g^3$, as hereinafter described.

Secured to the reduced portion $e^3$ of the collar $e$, as shown in Figs. 2 and 3, is a spiral spring $k$, one end of which is also secured to a ring member $n$, which incloses said spring $k$ and the reduced portion $e^3$ of the collar $e$, and the ring member $n$ is provided in its face or perimeter with a deep annular groove $n^2$, the side walls of which are provided with notches or recesses $n^3$, which are arranged substantially tangentially of the walls of the groove $n^2$, as shown in Fig. 5, so as to form teeth or projections $n^4$, all of which project in the same direction.

Both the inner and outer faces or the front and back faces of the collar $e$ are provided with openings $m$, through which the ends of the levers $g$ project, and adjacent to these openings, as shown in Fig. 5, are mounted pulleys or sheaves $m^2$, and connected with the outer or rear ends of the levers $g$, as shown at at $m^3$, are chains or other flexible devices $m^4$, which are passed inwardly, radially, and around the pulleys or sheaves $m^2$ and into the groove $n^2$ in the ring or band $n$, which incloses the spiral spring $k$ and to which said spiral spring is secured, and the free ends of the chains $m^4$ are provided with heads $m^5$, having T-heads $m^6$, which are adapted to engage the teeth or projections $n^4$ on the ring member $n$ at the opposite sides of the groove $n^2$. As thus constructed it will be seen that the spring $k$ operates at all times to turn the ring $n$ in one direction, that direction in the form of construction shown being to the right, and this results in pulling the chains or other devices $m^4$ also to the right, and the rear ends of the levers $g$ are drawn inwardly, and this operation of the chains $m^4$ may be regulated at all times. If it is desired to increase the pull of said chains on the levers $g$, the T-heads $m^6$ are detached from the ring member $n$ and said ring member is turned to the left by means of a suitable wrench or other device which is adapted to engage pins or holes $n^5$, secured to or formed in said ring, and when the required tension is thus applied to the spring $k$ the T-heads $m^6$ are again connected with the ring member $n$; but if it is desired to decrease the tension of the spring $k$, the inwardly-directed pull of said spring, and of the chains $m^4$ on the levers $g$, the above-described operation is reversed or the T-heads $m^6$ of the chains $m^4$ are disconnected from the ring member $n$, and said ring member is allowed to turn to the right until the tension of the spring $k$ is decreased.

The operation of my improved clutch will be readily understood from the foregoing description when taken in connection with the accompanying drawings and the following statement thereof. As shown in Fig. 2, the parts are not in their operative position, and the motion or movement of the shaft $x$ will not be transmitted to the shaft $x^2$ when the said shaft $x$ is turned. If it is desired to throw the clutch into operation, the lever-arm $f^6$ is moved in the direction of the arrow $y^2$ in Fig. 2 and the collar $e$ is moved forwardly. This operation of the cone member is transmitted through the levers $g$, toggle-links $g^2$, and toggle-levers $g^3$ to the movable friction members $h$ and $i$, which are forced into connection with the friction member $c^5$, which forms a part of the casing $b^2$ and which turns between the friction members $h$ and $i$, and if it is desired to throw the parts back into the inoperative position, so that the friction members $h$ and $i$ will not clutch the friction member $c^5$, the lever-arm $f^6$ is moved in the direction of the arrow $y$ in Fig. 2 and the operative parts of the clutch are returned to the position shown in said figure.

It will be observed that the spring $k$ forms a tension control for the levers $g$, and the pressure of the friction members $h$ and $i$ on the friction member $c^5$ will be largely regulated at all times by the tension of the spring $k$, and the tension of said spring may be regulated, as hereinafter described, by turning the ring member $n$ in the desired direction after the chains $m^4$ have been disconnected therefrom and then resecuring said chains to said ring member, all as hereinbefore described.

It will be understood that my improved clutch or the operative parts thereof are not influenced in any way by centrifugal force, and by employing a number of the levers $g$, which are connected with the spring-operated ring member $n$ at different points, the energy of the spring $k$ is subdivided and the operation of the said parts on the friction members $h$ and $i$ is thus equalized and the separate parts of the clutch are equally balanced. By making the clutch-casing member $c$ detachable and making said member of separate parts all the operative parts of the clutch are rendered easily accessible for cleaning, repairing, and other purposes, and the driving parts of the clutch may be substituted by new ones whenever desired. It will also be understood that in practice the casing $d$ is provided with a quantity of oil or partially filled with oil and the rotatable parts, including the parts $h$ and $i$ of the clutch which are movable toward and from the clutch member $c^5$, are all turned in oil and the overheating of the parts is thus avoided. Another feature of this clutch is that the operative parts thereof within the casing $d$ are all protected from dust and dirt of various kinds and classes, and the levers $g$ being under a tension control it will be apparent that the starting and stopping of the shaft $x^2$ may be effected gradually without the jerking, jolting, or jarring which usually accompanies the operation of clutches of this class as usually constructed.

Having fully described my invention, what I claim as new, and desire to secure by Letters Patent, is—

1. In a clutch of the class described, a casing adapted to be secured to a driven shaft and provided with a main annular clutch member, a driving-hub adapted to be connected with a driving-shaft and provided with radial arms having recesses in the ends thereof and projecting fingers, supplemental annular clutch members mounted on the opposite sides of the main clutch member and in the recesses of said arms, one of said supplemental annular clutch members being provided with ears which extend transversely of the other supplemental annular clutch member and inwardly thereof, toggle-levers pivoted to the fingers of said arms and to one of said supplemental annular clutch members and to the ears of the other supplemental annular clutch member, and means for moving the supplemental annular clutch members toward and from the main clutch member, substantially as shown and described.

2. In a clutch of the class described, a casing adapted to be secured to a driven shaft and provided with a main annular clutch member, a driving-hub adapted to be connected with a driving-shaft and provided with radial arms having recesses in the ends thereof and projecting fingers, supplemental annular clutch members mounted on the opposite sides of the main clutch member and in the recesses of said arms, one of said supplemental annular clutch members being provided with ears which extend transversely of the other supplemental annular clutch member and inwardly thereof, toggle-levers pivoted to the fingers of said arms and to one of said supplemental annular clutch members and to the ears of the other supplemental annular clutch member, and means for moving the supplemental annular clutch members toward and from the main clutch member, comprising a collar adapted to be mounted and movable longitudinally on the driving-shaft and provided with arms which project into said casing, main levers pivoted to the inner ends of said arms and extending outwardly through said collar, link devices connecting the main levers with said toggle-levers, and tensional devices connected with the collar for holding the said levers in a predetermined position, substantially as shown and described.

3. In a clutch of the class described, a casing adapted to be connected with a driven shaft and provided with a main annular clutch member, a driving-hub adapted to be connected with a driving-shaft and provided with radial arms, supplemental annular clutch members mounted on the opposite sides of the main clutch member, toggle-levers pivoted to said arms and loosely connected with said supplemental annular clutch members, and means for moving the supplemental annular clutch members toward and from the main clutch member, comprising a collar adapted to be mounted on and movable longitudinally on the driving-shaft and provided with arms which project into said casing, levers pivoted to said arms and extending outwardly through the collar and in operative connection with said toggle-levers, and tensional devices for holding said levers in a predetermined position, substantially as shown and described.

4. In a clutch of the class described, a casing composed of separate detachable parts and adapted to be connected with a driven shaft and provided with an inwardly-directed annular main clutch member, a hub adapted to be connected with a driving-shaft and provided with radially and outwardly directed arms within said casing, supplemental clutch members mounted on the opposite sides of the main clutch member and supported by the arms of said hub, toggle-levers pivoted to said arms and to the supplemental clutch members, a cone device mounted on the driving-shaft and movable longitudinally thereof and provided with arms which project inwardly between the arms of said hub, main levers pivoted to the arms of the cone device and provided with links which are connected with said toggle-levers, a spiral spring wound on a reduced portion of the cone device and one end of which is connected therewith, a ring member inclosing said spiral spring and to which the other end of said spring is secured, said ring member being provided with a deep annular groove, the side walls of which are provided with transverse notches or recesses forming teeth which project in the same direction, pulleys connected with the cone member, and flexible devices connected with the ends of the main levers and passed around said pulleys and provided at their free ends with heads adapted to engage said teeth, substantially as shown and described.

In testimony that I claim the foregoing as my invention I have signed my name, in presence of the subscribing witnesses, this 6th day of January, 1906.

JOSÉ GONZALEZ BABIO.

Witnesses:
    F. A. STEWART,
    C. J. KLEIN.